US005435606A

United States Patent [19]
Navazo

[11] Patent Number: 5,435,606
[45] Date of Patent: Jul. 25, 1995

[54] DEVICE FOR JOINING TRAYS FOR ELECTRICAL CONDUITS

[75] Inventor: Juan M. B. Navazo, Sant Cugat Del Valles, Spain

[73] Assignee: Aparellaje Electrico, S.A., Barcelona, Spain

[21] Appl. No.: 258,842

[22] Filed: Jun. 13, 1994

[30] Foreign Application Priority Data

Jun. 14, 1993 [ES] Spain ................................. 9301307

[51] Int. Cl.⁶ ............................................. F16L 45/00
[52] U.S. Cl. ..................................... 285/121; 285/424; 285/906; 138/92; 138/155; 174/68.3
[58] Field of Search ........................ 285/121, 424, 906; 138/92, 155; 174/68.3, 101

[56] References Cited

U.S. PATENT DOCUMENTS 917,328   4/1909  Lutz .................................... 285/121
4,077,434 3/1978  Sieckert et al. .................. 285/121 X
4,349,220 9/1982  Carroll et al. ....................... 285/121
4,398,564 8/1983  Young et al. ................... 285/121 X

FOREIGN PATENT DOCUMENTS 409807  1/1991  European Pat. Off. .
3014695 10/1981 Germany ............................ 174/68.3

Primary Examiner—Dave W. Arola
Attorney, Agent, or Firm—Staas & Halsey

[57] ABSTRACT

A device for joining trays includes a transverse portion and a sheetlike buttstrap. The transverse portion is flush with a transverse end edge of a lid section of a tray and engages the side walls of a base section of the tray by end walls which may be provided with projections or with hook-shaped legs. The transverse portion has retaining holes and is provided with a center tab extending longitudinally and which is covered by the lid section. The sheetlike buttstrap covers the transverse portion of the device and the part of the lid section covering the center tab. The sheetlike buttstrap is provided with resilient protuberances mating with the retaining holes.

12 Claims, 4 Drawing Sheets

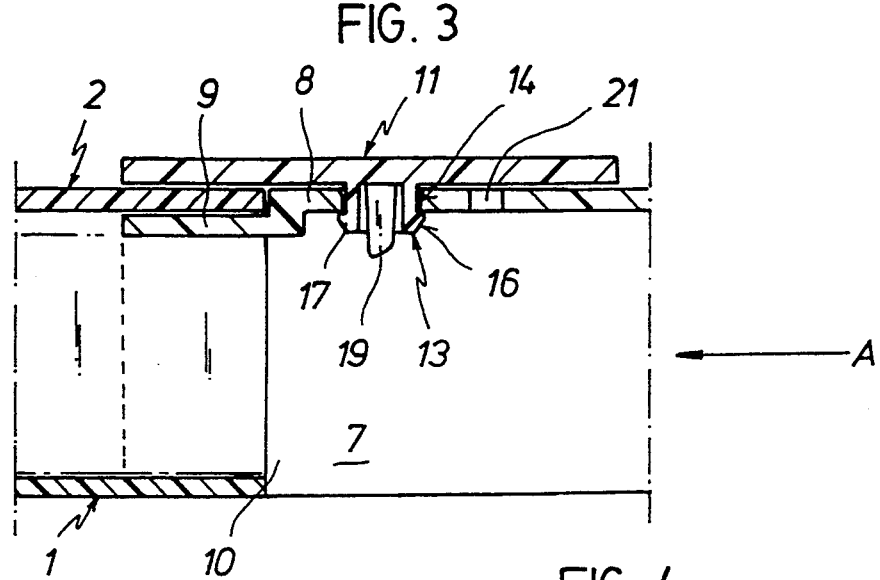
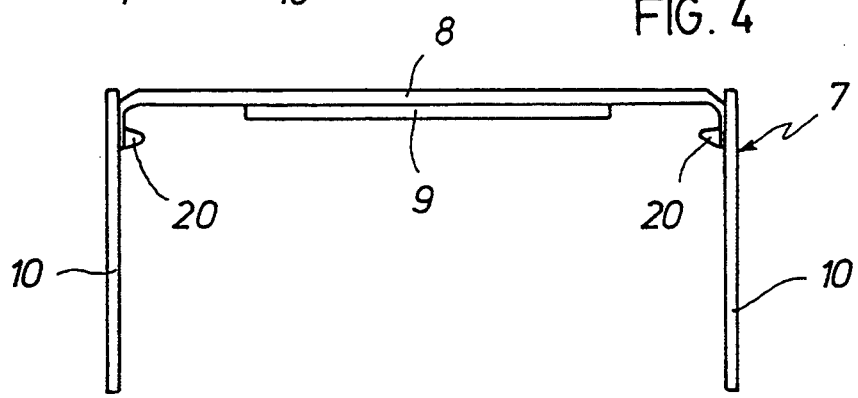
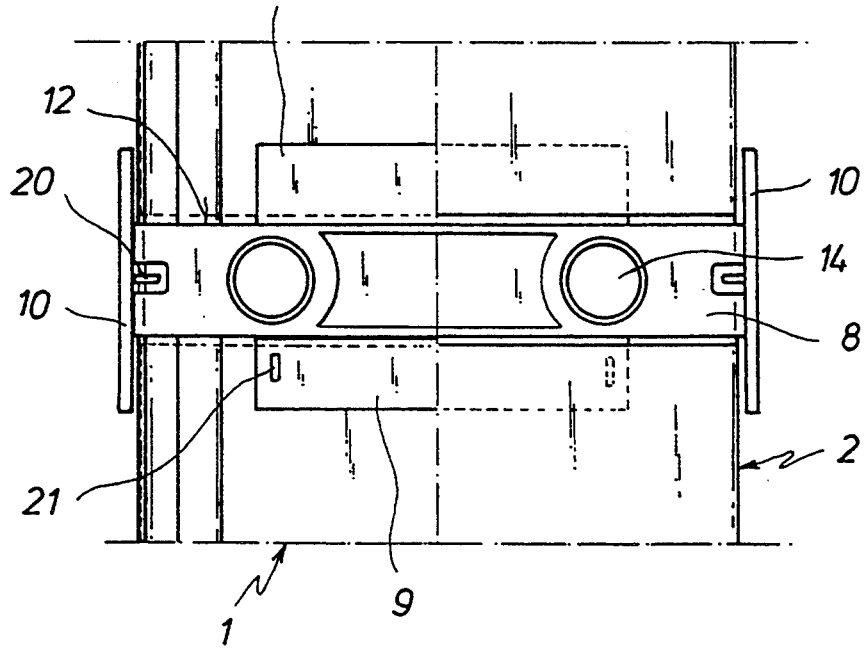

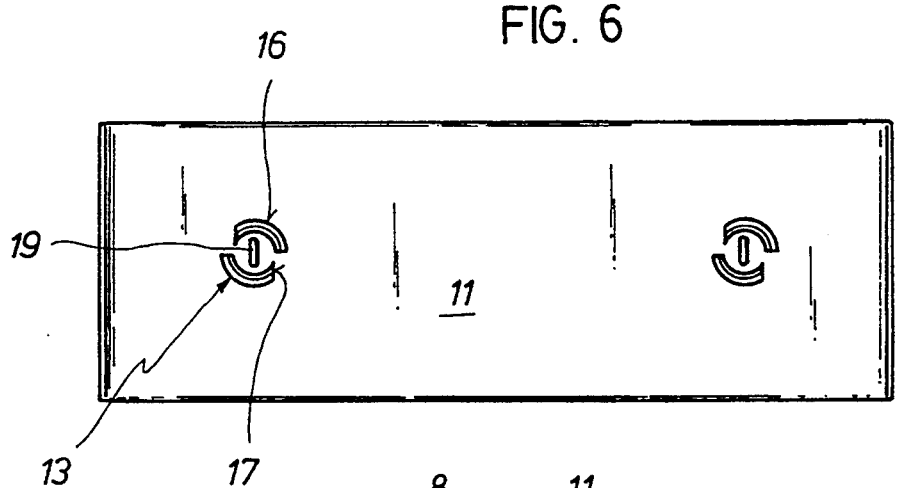
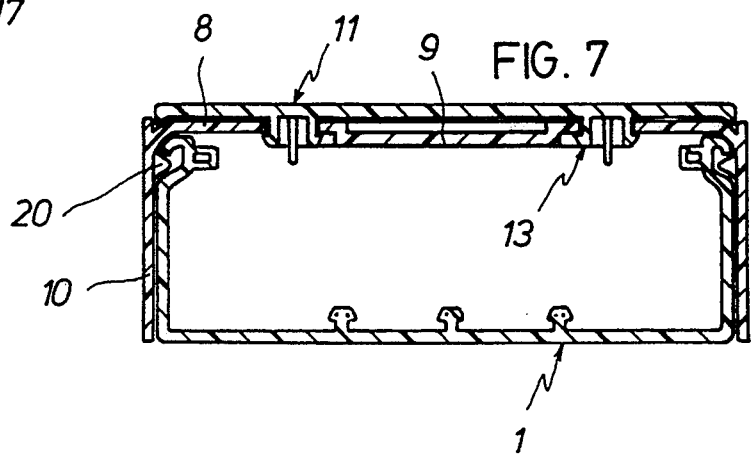
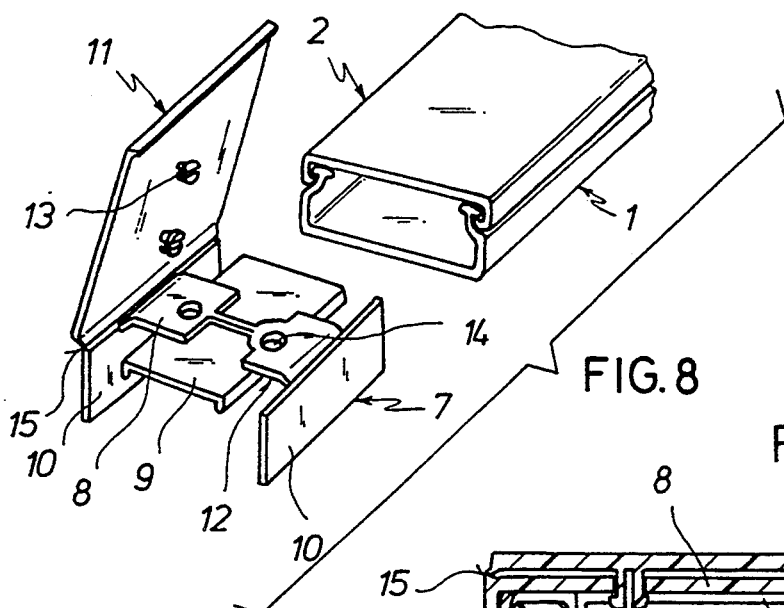
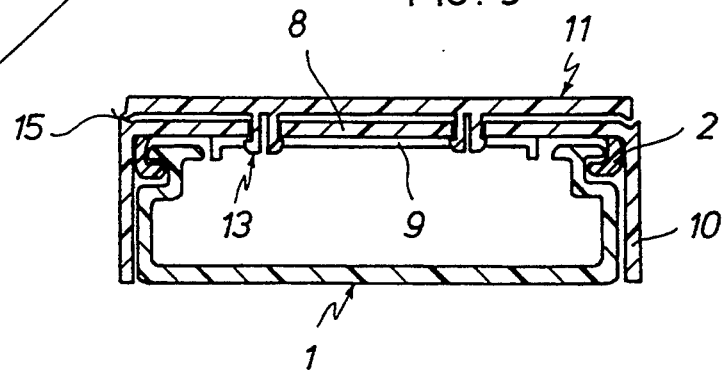

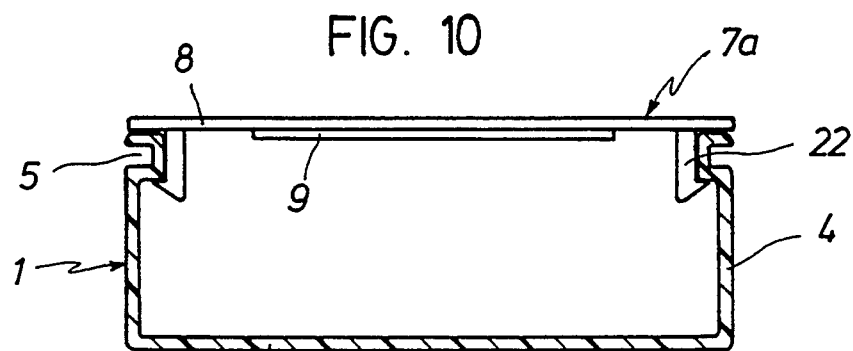
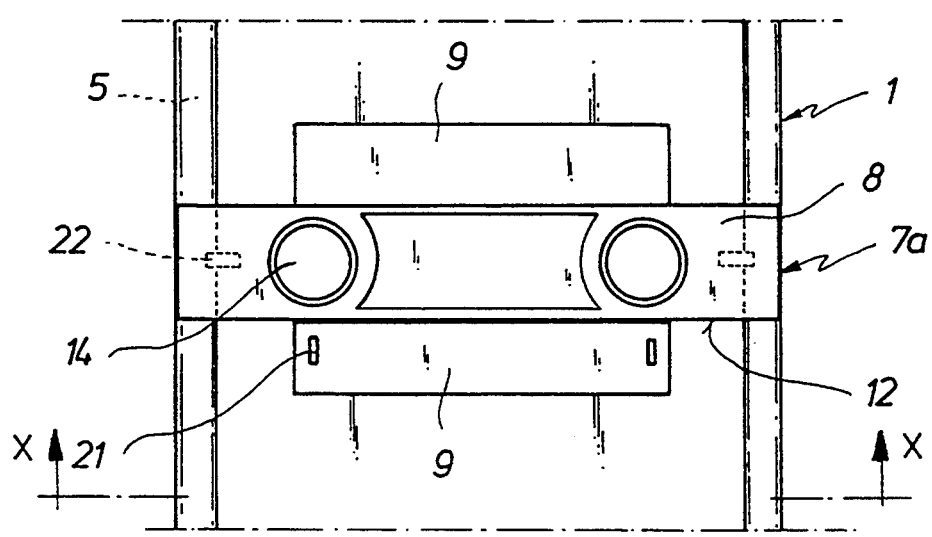
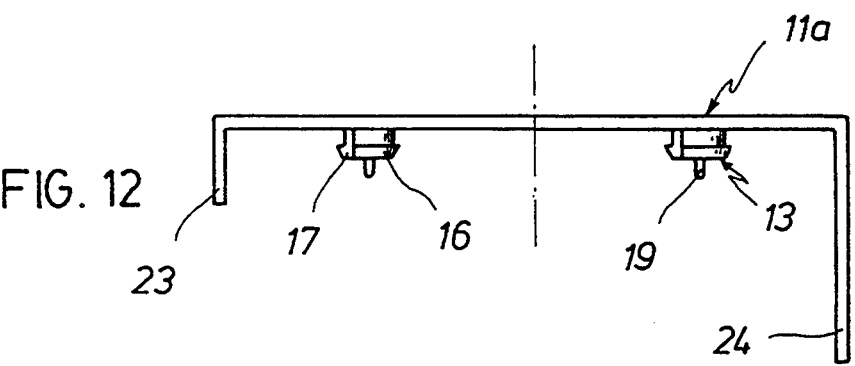
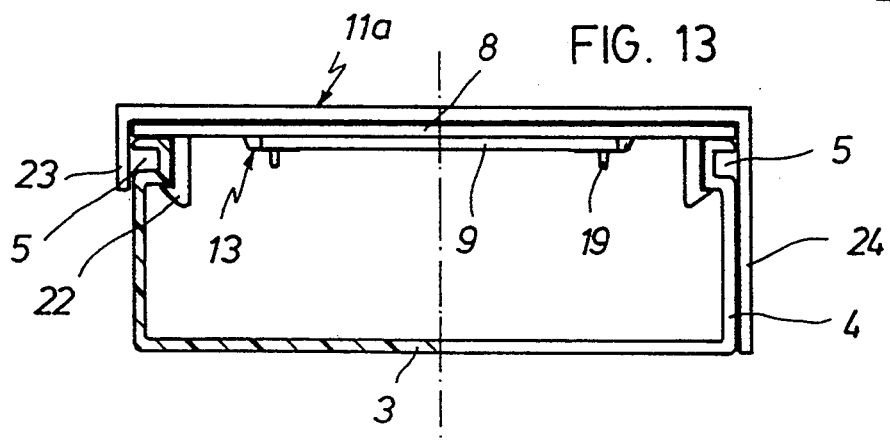

DEVICE FOR JOINING TRAYS FOR ELECTRICAL CONDUITS

FIELD OF THE INVENTION

The invention relates to a device for joining trays for electrical conduits, particularly for joining a first length of tray to a second length of tray or to an accessory, the trays being formed by a base section and by a lid section, the base section having a bottom wall and side walls in which there are longitudinal grooves forming a rear plane and the lid section being provided with inwardly directed lips capable of being retentively inserted in said longitudinal grooves, the lengths of tray forming transverse end edges of the base section and of the lid section.

BRIEF REFERENCE TO THE PRIOR ART

The trays for the electrical conduits are made according to set lengths which frequently do not coincide with the lengths used in the field. Therefore, successive connections or joints which are clearly visible, although the facing transverse edges are in mating abutment, have to be made. Also, when the trays have to be expressly cut for inserting electrical mechanism boxes or to form elbows, branches or terminations, it is not always possible to make such cuts with the required accuracy whereby, since the joint is visible, it spoils the accuracy and pulchritude of the installation.

Another point to bear in mind is that the presence of joints more or less accurately made between trays forms narrow gaps allowing moisture, dust and other foreign bodies to penetrate.

SUMMARY OF THE INVENTION

It is an object of the invention to adopt solutions which, further to overcoming the above drawbacks, provide a better finish to the installation. This object is achieved according to the invention by a device of the type mentioned at the beginning which is characterized in that it comprises a transitional transverse portion and a sheetlike buttstrap, said transitional transverse portion being adapted to be flush with a transverse end edge of said lid section and having means for engagement with said side walls; at least one center tab extending longitudinally from said transverse portion and being adapted to be covered by said lid section; and at least one retaining hole; and said sheetlike buttstrap being adapted to cover said transitional transverse portion and at least part of the lid section adapted to cover said center tab and having at least one resilient protuberance to be inserted retentively in said retaining hole.

With the embodiment of the invention, the safety and the appearance of the electrical installations with conductors housed in said trays are improved.

BRIEF DESCRIPTION OF THE DRAWINGS

Further advantages and features of the invention will be appreciated from the following description in which there is disclosed, without any limiting nature, preferred embodiments of the invention with reference to the accompanying drawings, in which:

FIG. 3 is a cross section view taken along line III—III of FIG. 2.

FIG. 4 is an elevation view of another embodiment, without the sheetlike buttstrap being shown.

FIG. 5 is a plan view of the embodiment of FIG. 4, joining two tray lengths with the lid section omitted from the left hand side.

FIG. 6 is a plan view from the inside of a sheetlike buttstrap which may be used with the embodiment of FIG. 4.

FIG. 7 is a right cross section view of the embodiment of FIGS. 4 and 6 applied to a tray.

FIG. 8 is an exploded perspective view of another embodiment of the invention, with the sheetlike buttstrap attached with a thin resilient sheet, a tray also being shown.

FIG. 9 is cross section view similar to that of FIG. 7 but corresponding to the embodiment of FIG. 8.

FIG. 10 is a cross section view taken along the line X—X of FIG. 11.

FIG. 11 is a plan view of another embodiment of the invention applied to the juncture of two tray lengths.

FIG. 12 is an elevation view of another embodiment of the buttstrap, with one short side wall for covering a portion of the groove of the lid section wall, with the opposite side wall being longer.

FIG. 13 is an elevation view of the sheetlike buttstrap of FIG. 12 applied to a tray shown partly in section.

DETAILED DESCRIPTION OF THE PREFERRED EMBODIMENTS

The device 7 for joining electrical conduit trays of the invention is used for joining together different lengths of trays or a length of tray to another item, which may be an accessory, such as an elbow, a branch, a mechanism box, a termination, etc.

Figure 1:
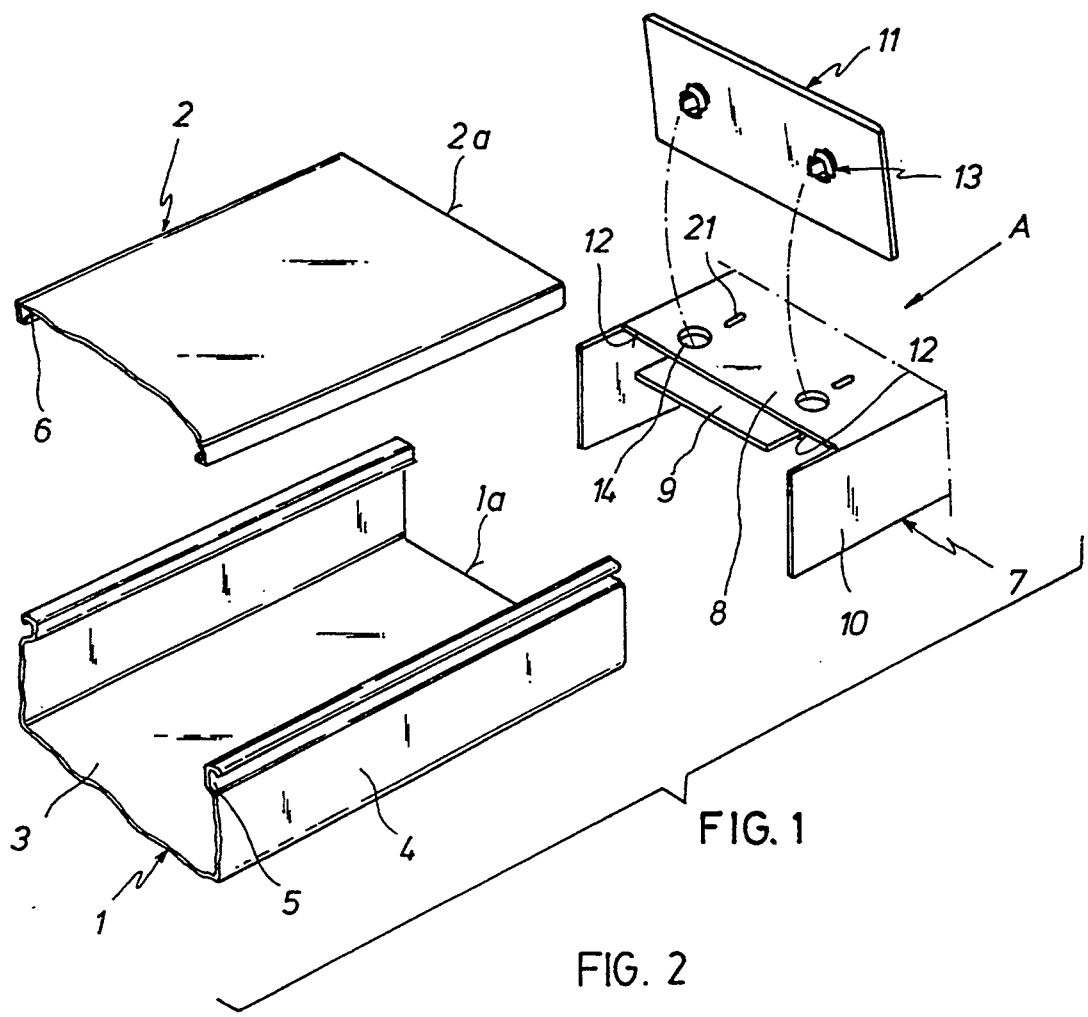
FIG. 1 is an exploded perspective view of one embodiment of a the invention, with a portion of tray also being shown.
Figure 2:
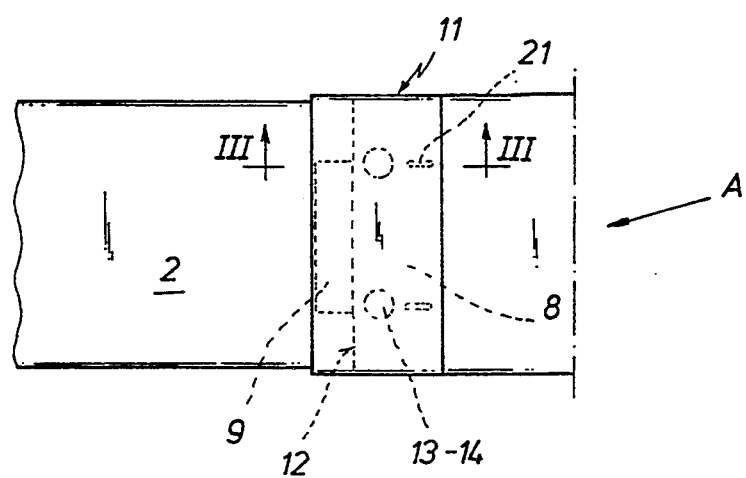
FIG. 2 is a plan view of the embodiment of FIG. 1 and of the tray portion.

The trays are of conventional type and are formed by a U-shaped rectangular base section 1, with a lid section 2 as shown in FIG. 1. The base section 1 has a bottom wall 3 and side walls 4, each of the latter having a longitudinal groove 5 in which there is inserted a corresponding inwardly directed side lip 6 of the lid section 2. In the description and the claims, the term "transverse" is intended to mean the direction of the shortest distance between the two side walls 4 of one same base section 1; or to the corresponding direction when referring to an element associated with a tray. Obviously, the term "longitudinal" designates a direction perpendicular to the above and other than the height.

A tray length has end transverse edges 1a of the base section 1 and 2a of the lid section 2, as seen in FIG. 1.

In the embodiments of FIGS. 1–9, the device 7 comprises a transverse transition portion 8 having at least one center tab 9 extending lengthwise relative to the transverse portion 8 and two end walls 10. There is also a sheetlike buttstrap 11 capable of being fitted over the transverse portion 8 and extending between the walls 10. Owing to the smaller width of the center tab 9, gaps 12 are formed between the transverse portion 8 and the tab 9. The sheetlike buttstrap 11 is attached to the transverse transition portion 8 by resilient protuberances 13 which are inserted in respective retaining holes 14 of the transverse portion 8.

As seen in the drawings, when the device 7 joins lengths of trays, the transverse transition portion 8 is flush and touches the transverse end edges 2a of the lid sections 2. Each center tab 9 is covered by one of the lid sections 2. The end walls 10 are adjacent the side walls 4 of the base sections 1, covering them at least in part. The transverse buttstrap 11 covers the transverse transition portion 8 and also the part of the lid sections 2 covering the center tabs 9.

In this way, the end portions of the base sections 1 of the tray lengths being joined are concealed by the end walls 10 of the device, with the area of contact between both base sections 1 thereby being concealed.

Further to its use for joining tray lengths, the device 7 may form part of an element A, which may be an accessory, such as an elbow, a branch, a mechanism box, a termination, etc.

FIGS. 8 and 9 show an embodiment in which the sheetlike buttstrap 11 is attached to the rest of the device 7 by a resilient sheet 15 which forms a hinge. In this case it is possible satisfactorily to use only one resilient connecting protuberance 13 with the hole 14. It is also possible to join the sheetlike buttstrap 11 to the rest of the device 7 with a removable navet, not shown in the figures, which is only of use prior to assembly to avoid loss of the sheetlike buttstrap 11.

The resilient protuberances 13 are preferably cylindrical or prismatic and furthermore tubular and are provided with a peripheral retaining bead 16. They also have preferably at least one axial cut 17. In FIG. 3 a flat tab 19 is shown extending from the protuberance and which is preferably generally trapezoidal in shape.

In FIGS. 1, 2, 3 and 5 the transverse portion 8 is seen to have elongated holes 21, in which the flat tabs 19 may be inserted. Such tabs 19 and holes 21 are useful for when the sheetlike buttstrap is independant from the transverse portion 8 so that the buttstrap 11 may be retained by inserting the flat tabs 19 in the holes 21 in the preassembly stages of the device.

FIGS. 4, 5 and 7 show an embodiment in which the end walls 10 are provided internally with complementary projections 20 which may be inserted in the respective grooves 5 of the base section 1. In FIG. 5 the projections 20 are seen through a notch in the portion 8.

The coupling device 7a may also have an arrangement such as seen in FIGS. 10, 11 and 13, formed by a transverse portion 8 having at least one center tab 9 and two hook-shaped legs 22 appropriate for attaching the device 7a over the base section 1 by engaging behind the longitudinal grooves 5. Such device 7a is complemented with a sheetlike buttstrap 11a which, further to the resiliant protuberances 13, is provided with lateral walls which may be short 23 or long 24. The short lateral walls 23 cover a portion of the groove 5 of the base section I and the long lateral walls 24 cover a portion of the whole of the side wall 4 of the base section. Where the sheetlike buttstrap 11a has to cover a cut made in the base section of the tray, buttstraps having long lateral walls 24 will be used.

What I claim is:

1. A device for joining trays for electrical conduits, each of said trays being formed by a base section and a lid section, the base section having a bottom wall and side walls, the side walls having external longitudinal grooves and the lid section being provided with inwardly directed lips retentively inserted in the longitudinal grooves, each of said trays having transverse end edges on the base section and the lid section, said device comprising a transverse portion and a sheetlike buttstrap, said transverse portion being flush with a transverse end edge of said lid section and having means in engagement with said side walls; at least one center tab extending longitudinally from said transverse portion and being covered by said lid section; and at least one retaining hole; and said sheetlike buttstrap covering said transverse portion and at least part of the lid section covering said center tab, said buttstrap having at least one resilient protuberance inserted retentively in said retaining hole.

2. The device of claim 1 wherein said engagement means comprise two end walls of said transverse portion which abut said side walls of said base section.

3. The device of claim 2, wherein said end walls are provided with internally extending projections retentively inserted in said longitudinal grooves.

4. The device of claim 1, wherein said transverse portion has two hook-shaped legs retentively engaging back sides of said grooves in the side walls of the base section.

5. The device of claim 1, wherein said resilient protuberance of said sheetlike buttstrap is provided with a peripheral retaining bead.

6. The device of claim 5, wherein said resilient protuberance is tubular and is divided by at least one axial cut.

7. The device of claim 6, wherein said sheetlike buttstrap is provided with at least one projecting flat tab generally centered on one of said resilient protuberances and said transverse portion has at least one elongated hole receiving said tab.

8. The device of claim 1, wherein said transverse portion and said sheetlike buttstrap are joined together by a thin resilient sheet extending between one edge of the sheetlike buttstrap and one edge of the transverse portion.

9. The device of claim 1, wherein said sheetlike buttstrap has at least one lateral wall engaging one of said side walls of the base section.

10. The device of claim 9, wherein said lateral wall covers at least a portion of said groove.

11. The device of claim 9, wherein said lateral wall covers substantially all of said side wall.

12. The device of claim 1, wherein said transverse portion is flush with the transverse end edges of the lid sections of two lengths of trays to be joined and has two center tabs extending in opposite directions and said sheetlike buttstrap covers said transverse portion and the whole of said center tabs.

* * * * *